(12) United States Patent
Sudarmani et al.

(10) Patent No.: US 11,379,280 B2
(45) Date of Patent: Jul. 5, 2022

(54) METHODS AND SYSTEMS FOR MANAGING COMMUNICATION LANES BETWEEN A UNIVERSAL FLASH STORAGE (USF) DEVICE AND A USF HOST

(71) Applicant: SAMSUNG ELECTRONICS CO., LTD., Suwon-si (KR)

(72) Inventors: Rengaraja Sudarmani, Chennai (IN); Dipakkumar Prafulkumar Abhani, Bangalore (IN); Neethu Acha Cherian, Kerala (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 16/737,547

(22) Filed: Jan. 8, 2020

(65) Prior Publication Data

US 2020/0341825 A1 Oct. 29, 2020

(30) Foreign Application Priority Data

Apr. 24, 2019 (IN) .............................. 201941016174

(51) Int. Cl.
*G06F 9/54* (2006.01)
*G06F 13/16* (2006.01)
*G06F 13/20* (2006.01)
*G06F 9/4401* (2018.01)

(52) U.S. Cl.
CPC ............ *G06F 9/546* (2013.01); *G06F 9/4418* (2013.01); *G06F 9/542* (2013.01); *G06F 13/1621* (2013.01); *G06F 13/20* (2013.01)

(58) Field of Classification Search
CPC ..................................................... G06F 9/546
See application file for complete search history.

(56) References Cited

U.S. PATENT DOCUMENTS

| 9,092,150 | B2 * | 7/2015 | Yerushalmi | ............. G06F 3/068 |
| 10,891,078 | B2 * | 1/2021 | Brief | ..................... G06F 3/0656 |
| 2011/0167287 | A1 * | 7/2011 | Walsh | ................... G06F 1/3209 |
| | | | | 713/323 |
| 2013/0091369 | A1 | 4/2013 | Shih | |
| 2015/0012671 | A1 | 1/2015 | Park et al. | |
| 2020/0064898 | A1 * | 2/2020 | Shen | ........................ G06F 1/08 |

OTHER PUBLICATIONS

Becky Loop et al., "PCIe NVMe* SSD in Smaller Form Factors", Aug. 9, 2016, Flash Memory Summit.
"PCI-SIG Engineering Charge Notice: M-PcIe" May 22, 2013, PCI-SIG.

* cited by examiner

*Primary Examiner* — Tammara R Peyton
(74) *Attorney, Agent, or Firm* — F. Chau & Associates, LLC

(57) ABSTRACT

A method for managing communication between a Universal Flash Storage (UFS) device and a UFS host includes determining at least one path of payload data flow along at least one of a transmission lane of the UFS host and a transmission lane of the UFS device. Based on the determined at least one path of the payload data flow, the method includes initiating, by operating at least one of the UFS host and the UFS device, at least one Hibernate state entry action. Further, the method includes initiating, by operating the at least one of the UFS host and the UFS device, at least one Hibernate state exit action after completion of transfer of a pre-determined number of data frames of the payload data between the UFS host and the UFS device.

20 Claims, 10 Drawing Sheets

US 11,379,280 B2

1

METHODS AND SYSTEMS FOR MANAGING COMMUNICATION LANES BETWEEN A UNIVERSAL FLASH STORAGE (USF) DEVICE AND A USF HOST

CROSS-REFERENCE TO RELATED APPLICATION

This application claims priority under 35 U.S.C. § 119 to Indian Patent Application No. 201941016174 filed on Apr. 24, 2019, the disclosure of which is incorporated by reference herein in its entirety.

TECHNICAL FIELD

Exemplary embodiments of the inventive concept relate to a Universal Flash Storage (UFS) system, and more particularly to reducing power consumption during communication between a UFS device and a host.

DISCUSSION OF RELATED ART

A Universal Flash Storage (UFS) system is a flash memory system defined by the Joint Electron Device Engineering Council (JEDEC) standard for high data transfer speed. The UFS system includes a UFS device which may be embedded within a UFS host such as a processor, a System on Chip (SoC), an electronic device, and so on. The UFS device may include an interface which establishes one or more lanes between the UFS host and the UFS device. The UFS host and the UFS device may communicate with each other through the established lanes. However, during data transfer between the UFS host and the UFS device, at least one lane may be idle for 90%-95% of a power ON period. Thus, power consumption may be relatively high.

FIGS. 1a and 1b illustrate a conventional Universal Flash Storage (UFS) system having unnecessary power consumption when realizing data communication between a UFS host and a UFS device. A conventional UFS system 100 includes a UFS host 102 and a UFS device 104. The UFS host 102 and the UFS device 104 each includes a physical layer interface with a pair of transmitting (Tx) and reception (Rx) units. The Tx and the Rx of the physical layer interface of the UFS device 104 may be connected to the Tx and Rx of the physical layer interface of the UFS host 102, thereby establishing lanes between the UFS host 102 and the UFS device 104 for initiating data transaction between the UFS device 104 and the UFS host 102. A write transaction between the UFS host 102 and the UFS device 104 in the conventional UFS system 100 is illustrated in FIG. 1a. A read transaction between the UFS host 102 and the UFS device 104 in the conventional UFS system 100 is illustrated in FIG. 1b.

As illustrated in FIG. 1a, the UFS host 102 sends a write command (Write CMD UPIU (write command Universal UFS Protocol Information Unit)) to the UFS device 104 for writing data to storage of the UFS device 104. In response to the write command, the UFS device 104 sends an RTT (Ready to Transfer) response to the UFS host 102 for receiving the data. On receiving the RTT response from the UFS device 104, the UFS host 102 sends the data to the UFS device 104. During the reception of the data from the UFS host 102, the Tx of the UFS device 104 becomes idle. When the Tx of the UFS device 104 becomes idle, the UFS device 104 keeps on sending filler symbols (FLR symbols) and Acknowledgment Frame Control (AFC) symbols as an acknowledgment for the reception of the received data.

2

However, to send the filler symbols, the state of the Tx of the UFS device 104 needs to be in active state, thus resulting in the consumption of the power by the Tx of the UFS device 104.

As illustrated in FIG. 1b, the UFS host 102 sends a read command to the UFS device 104 for fetching the data from the storage of the UFS device 104. On receiving the read command from the UFS host 102, the UFS device 104 sends the data to the UFS host 102. When the Tx of the UFS host 102 becomes idle, the UFS host 102 keeps on sending filler symbols (FLR symbols) and Acknowledgment Frame Control (AFC) symbols as acknowledgment for the reception of the received data. However, to receive the filler symbols, the state of the Rx of UFS device 104 needs to be in active state, thus resulting in the consumption of the power by the Tx of the UFS Host 102.

SUMMARY

According to an exemplary embodiment of the inventive concept, a method for managing communication between a Universal Flash Storage (UFS) device and a UFS host includes determining, by a device, at least one path of payload data flow along at least one of a transmission lane of the UFS host and a transmission lane of the UFS device, where the device includes at least one of the host and the UFS device. The method includes initiating, by the device, at least one Hibernate state entry action based on the determined at least one path of the payload data flow between the UFS host and the UFS device. Further, the method includes initiating, by the device, at least one Hibernate state exit action after completion of transfer of a pre-determined number of data frames of the payload data between the UFS host and the UFS device.

According to an exemplary embodiment of the inventive concept, a method for reducing power consumption in a Universal Flash Storage (UFS) system including a UFS host and a UFS device includes detecting, by a device, a path of payload data flow, where the device is at least one of the UFS host and the UFS device, switching, by the device, a transmission lane of the UFS host to a Hibernate state on determining that the path of the payload data flow is along a transmission lane of the UFS device, and exiting, by the device, from the Hibernate state of the transmission lane of the UFS host after completion of transfer of a pre-determined number of data frames of the payload data.

According to an exemplary embodiment of the inventive concept, a Universal Flash Storage (UFS) system includes a device, where the device is at least one of a UFS host and a UFS device. The device is configured to determine at least one path of payload data flow along at least one of a transmission lane of the UFS host and a transmission lane of the UFS device. The device is further configured to initiate at least one Hibernate state entry action based on the determined at least one path of the payload data flow. The device is further configured to initiate at least one Hibernate state exit action after completion of transfer of a pre-determined number of data frames of the payload data between the UFS host and the UFS device.

According to an exemplary embodiment of the inventive concept, a Universal Flash Storage (UFS) system includes a device, where the device is at least one of a UFS host and a UFS device. The device is configured to detect a path of payload data flow; switch a transmission lane of the UFS host to a Hibernate state on determining that the path of the payload data flow is along a transmission lane of the UFS device; and exit the Hibernate state of the transmission lane of the UFS host after completion of transfer of a predetermined number of data frames of the payload data.

BRIEF DESCRIPTION OF FIGURES

The above and other features of the inventive concept will be more clearly understood by describing in detail exemplary embodiments thereof with reference to the accompanying drawings.

DETAILED DESCRIPTION OF THE EMBODIMENTS

Figure 1A:
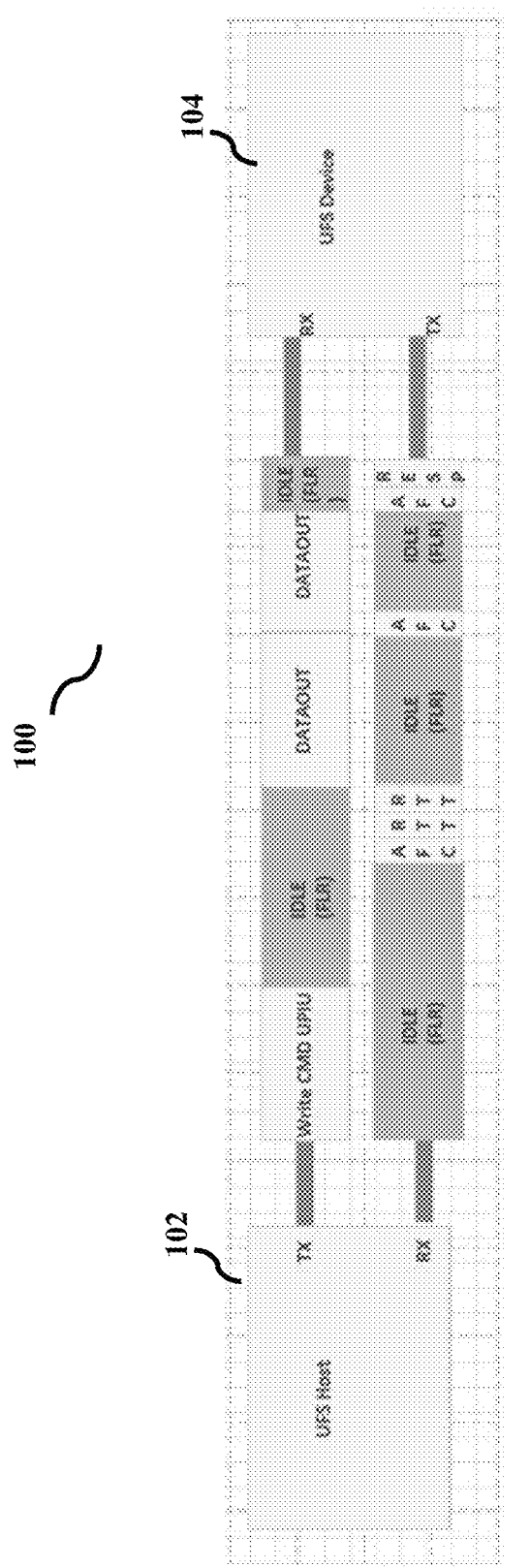
FIGS. 1a and 1b illustrate a conventional Universal Flash Storage (UFS) system having unnecessary power consumption when realizing data communication between a UFS host and a UFS device.
Figure 1B:
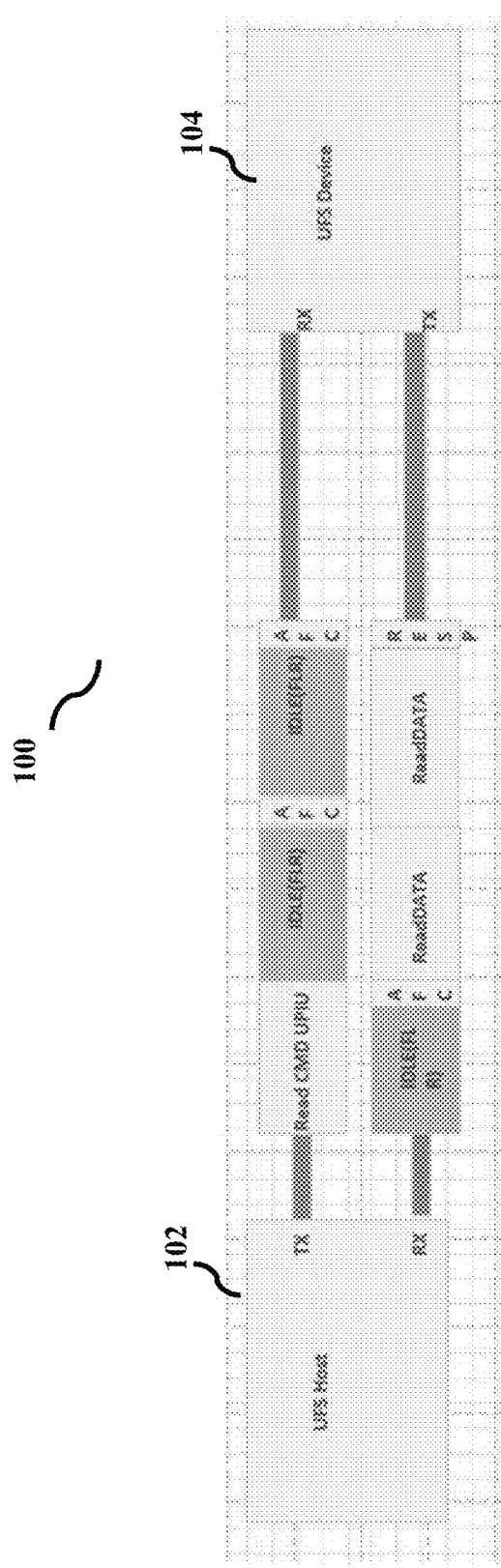

Exemplary embodiments of the inventive concept provide methods and systems for reducing power consumption during a communication between a Universal Flash Storage (UFS) device and a UFS host.

Exemplary embodiments of the inventive concept also provide a method for determining at least one of a write transaction and a read transaction, and accordingly operating at least one of the UFS host and the UFS device to enter into an ultra-low power (Hibernate) state and exit the ultra-low power state in a single direction to reduce power consumption.

Exemplary embodiments of the inventive concept further provide a method to exit the ultra-low power state by detecting an error during data transfer between the UFS device and the UFS host.

Exemplary embodiments of the inventive concept will be described more fully hereinafter with reference to the accompanying drawings.

Referring now to the drawings, and more particularly to FIGS. 2 through 6b, like reference numerals may refer to like elements throughout this application.

Figure 2:
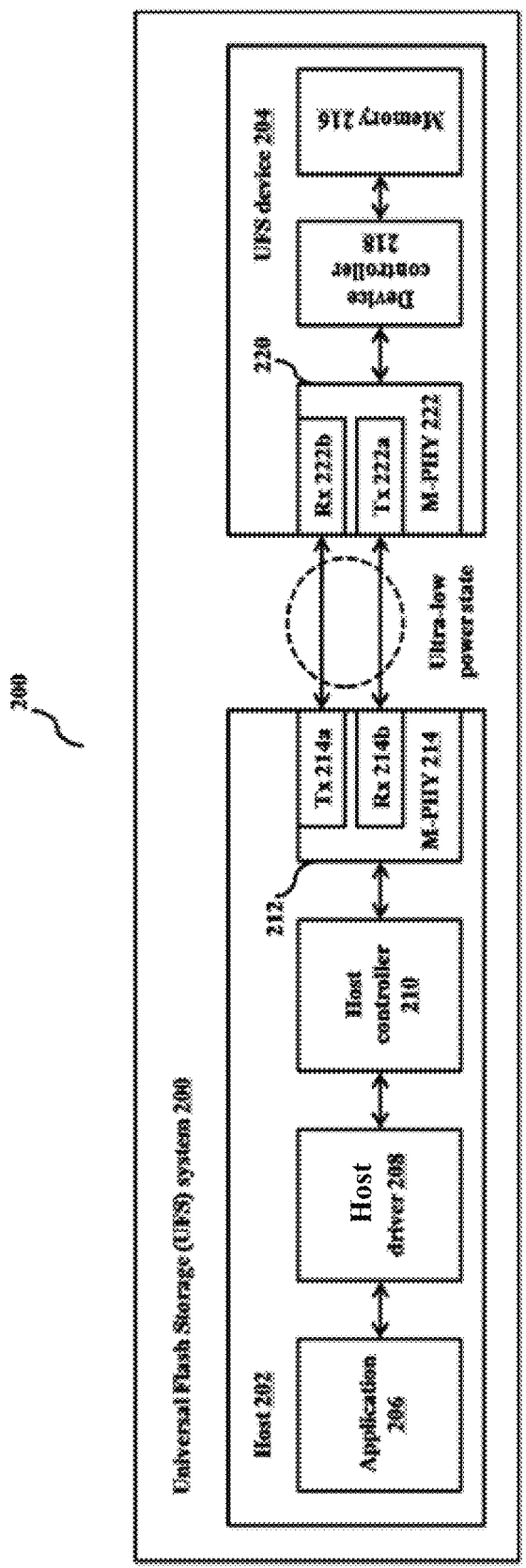
FIG. 2 illustrates an architecture of a UFS system according to an exemplary embodiment of the inventive concept.

FIG. 2 illustrates an architecture of a Universal Flash Storage (UFS) system, according to an exemplary embodiment of the inventive concept. In an exemplary embodiment of the inventive concept, a UFS system 200 is a UFS memory storage system defined by the Joint Electron Device Engineering Council (JEDEC) standard for high data transfer speed.

The UFS system 200 includes a UFS host 202 and a UFS device 204. Examples of the UFS host 202 described herein can be, but is not limited to, a processor, a System on Chip (SoC), a server, an integrated chip (IC), a mobile computing device, a mobile phone, a smartphone, tablet, a phablet, a personal digital assistant (PDA), a laptop, a computer, a wearable device, an IoT (Internet of Things) device, a wearable computing device, a vehicle infotainment system, a medical device, a camera, an application processor (AP), a multiprocessor system, a microprocessor based programmable consumer electronics, a network computer, a mini-computer, a mainframe computer, or any other device which supports the UFS device 204. The UFS device 204 herein refers to a storage device including a non-volatile memory.

The UFS host 202 includes an application 206, a host driver 208, a UFS host controller 210, and a UFS Host interface 212. The application 206 may include application programs/computer instructions to operate the UFS host 202. The host driver 208 can be configured to control peripheral devices (for example, the UFS device 204) connected to the UFS host 202, and provide functions of controlling the peripheral devices to the application 206. In an exemplary embodiment of the inventive concept, the application 206 and the host driver 208 can be at least one of a firmware or software. The UFS host controller 210 can be configured to communicate with the UFS device 204. The UFS host controller 210 can be controlled by the host driver 208. In an exemplary embodiment of the inventive concept, the UFS host 202 may include a buffer memory (which can be used as a main memory or a cache memory) for temporarily storing the data, which is to be provided to the UFS device 204. The UFS host interface 212 can be configured to establish communication between the UFS host controller 210 of the UFS host 202 and the UFS device 204. The UFS host interface 212 includes a link layer and a physical layer (referred as M-PHY) 214. The combination of the link layer and the physical layer 214 forms a UFS Interconnect Layer (UIC). The physical layer 214 includes a transmission unit (Tx) 214a for sending data from the UFS host 202 to the UFS device 204 and a reception unit (Rx) 214b for receiving the data by the UFS host 202 from the UFS device 204.

In an example herein, the link layer may be implemented as Mobile Industry Processor Interface (MIPI) Unipro and the physical layer 214 may be implemented as MIPI M-PHY. The MIPI Unipro is structured as a stack of protocol layers capable of supporting high data transfer speed with multiple lanes. The MIPI Unipro includes a physical adapter layer L1.5, a data link layer L2, a network layer L3, a transport layer L4, and a device management entity (DME). The DME controls the physical adapter layer L1.5, the data link layer L2, the network layer L3, and the transport layer L4.

The UFS device 204 includes a memory 216, a device controller 218, and a device interface 220. The memory 216 can be configured to perform operations such as, but not limited to, a write data, a read data, an erase data, and so on. Examples of the memory 216 described herein can be, but are not limited to, a flash memory, a Magnetic Random Access Memory (MRAM), a Phase change RAM (PRAM, a Ferroelectric RAM (RFAM), a NAND Flash memory, or any other non-volatile memory. In addition, the UFS device 204 may include a buffer memory as temporary storage which contains the data to be stored in the memory 216. The device controller 218 can be configured to control the operations of the memory 216. The device interface 220 can be configured to establish the communication between the UFS device 204 and the UFS host 202. The device interface 220 can include a physical layer (referred as M-PHY) 222 and a link layer. The link layer and the physical layer 222 of the device interface 220 forms the UFS Interconnect Layer (UIC). The Physical layer 222 further comprises a transmission unit (Tx) 222a for sending the data to the UFS host 202 and a reception unit (Rx) 222b for receiving the data from the UFS host 202. In an example herein, the link layer may be implemented as MIPI Unipro and the physical layer 222 may be implemented as MIPI M-PHY. In addition, the UFS device 204 may include an application which can include the software programs/computer instructions to operate the device controller 218.

Further, the Tx 214a and the Rx 214b of the UFS host 202 can be connected with the Rx 222b and the Tx 222a of the UFS device 204 to form lanes which facilitates at least one of a write transaction or a read transaction between the UFS host 202 and the UFS device 204. In an exemplary embodiment of the inventive concept, the connection between the Tx 214a of the UFS host 202 and the Rx 222b of the UFS device 204 can be referred as a transmission lane of the UFS host 202 and a reception lane of the UFS device 204. Similarly, the connection between the Tx 222a of the UFS device 204 and the Rx 214b of the UFS host 202 can be referred as a transmission lane of the UFS device 204 and a reception lane of the UFS host 202.

Exemplary embodiments herein are further explained where a single lane is formed between the UFS host 202 and the UFS device 204, but the inventive concept is not limited thereto. For example, any number of lanes may be formed between the UFS host 202 and the UFS device 204.

In an exemplary embodiment of the inventive concept, whenever the UFS host 202 wants to write the data to the UFS device 204 or fetch/read the data from the UFS device 204, the application 206 of the UFS host 202 schedules a command and outputs the command to the UFS host controller 210 of the UFS host 202. The command can be at least one of a write command or a read command. In an example herein, the data may be considered as payload data (data received by the at least one of the UFS host 202 and the UFS device 204). The UFS host controller 210 can send the command to the UFS device 204 through the Tx 214a. On receiving the command from the UFS host 202, the device controller 218 of the UFS device 204 processes the command. Alternatively, the UFS host controller 210 can process the command scheduled by the application 206.

Based on the processed command, at least one of the UFS host controller 210 of the UFS Host 202 and the device controller 218 of the UFS device 204 determines whether a path of payload data flow is along the transmission lane of the UFS host 202 or the transmission lane of the UFS device 204. When the path of payload data is along the transmission lane of the UFS host 202, the transmission lane of the UFS device 204/the reception lane of the UFS host 202 can be switched to a Hibernate state by operating the at least one of the UFS host controller 210 and the device controller 218. The transmission lane of the UFS device 204/the reception lane of the UFS host 202 can be switched to the Hibernate state by enabling the Tx 222a of the UFS device 204 and the Rx 214b of the UFS host 202 to enter into the Hibernate state.

When the path of the payload data is along the transmission lane of the UFS device 204, the transmission lane of the UFS host 202/the reception lane of the UFS device 204 can be switched to the Hibernate state by operating the at least one of the UFS host controller 210 and the device controller 218. The transmission lane of the UFS host 202/the reception lane of the UFS device 204 can be switched to the Hibernate state by enabling the Tx 214a of the UFS Host 202 and the Rx 222b of the UFS device 204 to enter into the Hibernate state.

In an exemplary embodiment of the inventive concept, the Hibernate state may be an ultra-low power state which enables at least one of the Tx 222a & Rx 214b pair and the Tx 214a & Rx 222b pair to reduce its activity to the lowest possible state. Exemplary embodiments herein use the terms 'ultra-low power state', 'Hibernate state', and so on, to refer to the reduced activity of the at least one of the physical layer 222 of the UFS device 204 and the physical layer 214 of the UFS host 202.

After switching of the transmission lane of the UFS device 204 to the Hibernate state, the data can be transferred from the UFS host 202 to the UFS device 204. After completion of transfer of a pre-determined number of data frames of the payload data between the UFS host 202 and the UFS device 204, the transmission lane of the UFS device 204 may exit the Hibernate state by enabling the Tx 222a of the UFS device 204 and the Rx 214b of the UFS Host 202 to exit from the Hibernate state.

Similarly, after switching of the transmission lane of the UFS host 202 to the Hibernate state, the data can be transferred from the UFS device 204 to the UFS host 202. After completion of transfer of the pre-determined number of data frames of the payload data between the UFS device 204 and the UFS host 202, the transmission lane of the UFS host 202 may exit the Hibernate state by enabling the Tx 214a of the UFS host and the Rx 222b of the UFS device 204 to exit from the Hibernate state. Thus, a short entry and exit into the Hibernate state reduces unnecessary consumption of power in the UFS system 200.

FIG. 2 shows exemplary units of the UFS system 200, but the inventive concept is not limited thereto. In exemplary embodiments of the inventive concept, the UFS system 200 may include less or more number of units. Further, the labels or names of the units are used only for illustrative purpose and do not limit the scope of the inventive concept. One or more units can be combined together to perform the same or a substantially similar function in the UFS system 200.

Figure 3A:
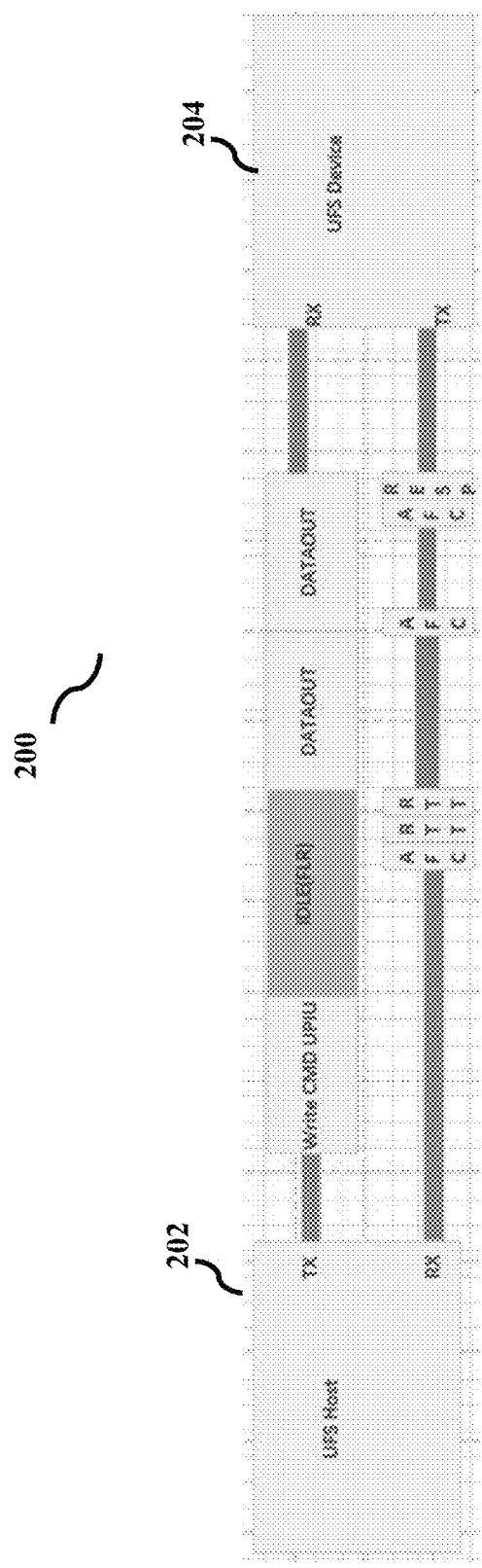
FIG. 3a is a diagram illustrating a write transaction between a UFS host and a UFS device in the UFS system of FIG. 2, according to an exemplary embodiment of the inventive concept.

FIG. 3a is a diagram illustrating a write transaction between a UFS host and a UFS device in the UFS system of FIG. 2, according to an exemplary embodiment of the inventive concept.

Exemplary embodiments herein enable the UFS host 202 to send at least one of payload data, commands, responses, and so on to the UFS device 204 through the Tx 214a of the physical layer 214 of the UFS host 202. The UFS host 202 shall receive the at least one of the payload data, the responses, the commands, and so on from the UFS device 204 through the Rx 214b of the physical layer 214 of the UFS Host 202. Similarly, the UFS device 204 can send the at least one of the payload data, the responses, the commands, and so on to the UFS host 202 through the Tx 222a of the physical layer 222 of the UFS device 204. The UFS device 204 can receive the at least one of the payload data, the responses, the commands, and so on from the UFS host 202 through the Rx 222b of the physical layer 222 of the UFS device 204.

As illustrated in FIG. 3a, during a write transaction, the application 206 of the UFS host 202 schedules a write command ('Write CMD UPIU' (UFS Protocol Information Unit)) for writing the payload data to the memory 216 of the UFS device 204. The write command may include information such as, but not limited to, size of the payload data, an address of a memory area associated with the memory 216 of the UFS device 204, and so on. The application 206 outputs the write command to the UFS host controller 210. The UFS host controller 210 sends the write command to the UFS device 204.

On receiving the write command, the device controller 218 of the UFS device 204 decodes the write command and determines that the path of the payload data flow is along the transmission lane of the UFS Host 202. After decoding the write command, the device controller 218 sends a 'RTT (Ready To Transfer) UPIU' response to the UFS host 202. The 'RTT UPIU' response indicates an available size of the memory 216 of the UFS device 204 for storing the payload data. The device controller 218 and the UFS host controller 210 can be operated to switch the transmission lane of the UFS device 204 to the Hibernate state as the path of the payload data is along the transmission lane of the UFS host 202.

For switching the transmission lane of the UFS device 204 (Tx 222a and Rx 214b) to the Hibernate state, the device controller 218 sends a power mode change (PMC) request ('PMC.REQ') to the UFS host 202. The PMC request includes PACP (PHY (Physical layer) Adapter Control Protocol) standard frames. On receiving the PMC request from the UFS device 204, the UFS host controller 210 sends power mode change confirmation ('PMC.CNF') to the UFS device 204. On receiving the power mode change confirmation from the UFS host 202, the device controller 218 switches the state of the Tx 222a of the physical layer 222 of the UFS device 204 to the Hibernate state. On transmitting the power mode change confirmation to the UFS device 204, the UFS host controller 210 switches the state of the Rx 214b of the physical layer 214 of the UFS host 202 to the Hibernate state. The UFS host 202 further starts sending the payload data (DATAOUT) to the UFS device 204. In an exemplary embodiment of the inventive concept, the payload data transmission occurs over bursts which include at least one of a high speed state (HS state) and a low speed state (LS state).

On receiving the pre-determined number of data frames of the payload data from the UFS host 202, the device controller 218 enables the Tx 222a of the UFS device 204 to exit the Hibernate state. In an exemplary embodiment of the inventive concept, the number of data frames may be pre-determined by the at least one of the UFS host 202 and the UFS device 204 based on the size of the payload data which needs to be transferred between the UFS host 202 and the UFS device 204. Thus, the Tx 222a can be enabled to exit the Hibernate state for sending at least one of acknowledgment ('AFC') frames and another 'RTT UPIU' response to the UFS host 202. The 'AFC' frames may acknowledge the received pre-determined number of data frames. Another 'RTT UPIU' may be sent to the UFS host 202 for the reception of remaining data frames of the payload data. Thus, the Tx 222a can wake up only after receiving the pre-determined number of data frames which reduces random subsequent switching of the Tx 222a of the UFS device 204 from the Hibernate state to the active state. In an exemplary embodiment of the inventive concept, the Tx 222a and the Rx 214b may be enabled to enter and exit the Hibernate state repeatedly until the completion of transfer of the payload data from the UFS host 202 to the UFS device 204.

Further, the UFS device 204 may detect an error in the payload data flow before completion of transfer of the pre-determined number of data frames from the UFS host 202. The UFS device 204 informs the UFS host 202 about the detected error. Based on the detected error, the UFS device 204 and the UFS host 202 enable the Tx 222a and the Rx 214b (the transmission lane of the UFS device 204) to exit the Hibernate state. The UFS device 204 may detect the error in the payload data flow based on error conditions such as, but not limited to, detection of at least one of a cyclic redundancy check (CRC) error in an incoming frame of the payload data, a Rx buffer overflow of any Traffic Classes (TC), reception of a frame of the payload data with a payload length more than DL_SYMBOL_MTU symbols in any TC, an incorrect frame sequence number in the received data frames of the payload data for any TC, and so on.

The error conditions (based on which the error can be detected) can be identified when
  a) an AFCx symbol is not followed by two data symbols;
  b) a Negative Acknowledgment Control (NAC) symbol is not followed by one data symbol; or
  c) an EOF_EVEN or an EOF_ODD (EOF=end of frame) symbol (CRC symbol) is not followed by a data symbol.

Further, the error conditions can be identified on determining at least one of:
  a) reception of a PA_ERROR.ind;
  b) reception of a continuation of frame (COF) symbol or an EOF_EVEN or an EOF_ODD symbol when a frame has not been started;
  c) reception of a start of frame (SOF) symbol when a data frame of the same TC is already ongoing and the data frame is not currently preempted;
  d) reception of an SOF symbol with TC=0 when a TC1 data frame is already ongoing;
  e) reception of a COF symbol continuing a data frame of a different TC;
  f) reception of an EOF_EVEN, an EOF_ODD, or a data symbol after the CRC of a preempting frame,
  g) reception of a DL control symbol (data/control symbols) with invalid values for defined fields (undefined Control Symbol Type or TC); or
  h) reception of an unexpected framing sequence, data symbols received between the frames, and so on.

On receiving the complete payload data, the device controller 218 of the UFS device 204 sends a response UPIU ('RESP') to the UFS host 202 indicating a successful write transaction. For example, consider a scenario where the UFS host 202 wants to write 8 KB of data to the memory 216 of the UFS device 204. Since the UFS host 202 wants to perform the write transaction, the device controller 218 of the UFS device 204 and the UFS host controller 210 switch the transmission lane of the UFS device 204 to the Hibernate state by enabling the Tx 222a of the UFS device 204 and the Rx 214b of the UFS host 202 to enter into the Hibernate state. Once the Tx 222a of the UFS device 204 and the Rx 214b of the UFS host 202 enter into the Hibernate state, the UFS host 202 starts sending the data to the UFS device 204. In an exemplary embodiment of the inventive concept, on receiving 4 KB of data from the UFS host 202 through the Rx 222b, the device controller 218 enables the Tx 222a to exit the Hibernate state and the UFS host controller 210 enables the Rx 214b to exit the Hibernate state. The Tx 222a of the UFS device 204 may send the 'AFC' frames to the UFS host 202 for acknowledging the reception of 4 KB of data. Further, on receiving the remaining 4 KB of data, the device controller 218 of the UFS device 204 sends the 'AFC' and 'RESP' response to the UFS host 202 indicating the successful reception of 8 KB of data. Thus, unnecessary power consumption can be prevented.

Figure 3B:
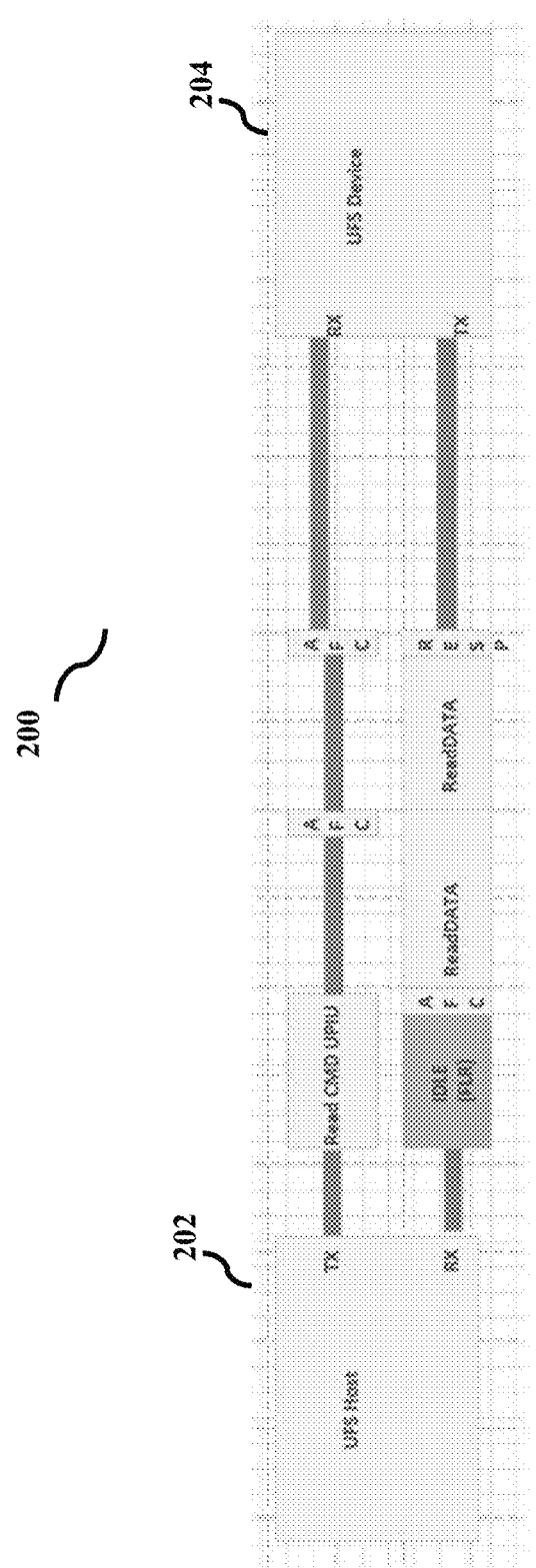
FIG. 3b is a diagram illustrating a read transaction between the UFS host and the UFS device in the UFS system of FIG. 2, according to an exemplary embodiment of the inventive concept.

FIG. 3b is a diagram illustrating a read transaction between the UFS host and the UFS device in the UFS system of FIG. 2, according to an exemplary embodiment of the inventive concept.

As illustrated in FIG. 3b, during the read transaction, the application 206 of the UFS host 202 schedules a read command ('Read CMD UPIU') for fetching/reading the payload data from the memory 216 of the UFS device 204. The read command may include information such as, but not limited to, required data, an address of a memory area associated with memory 216 of the UFS device 204, and so on. The application 206 outputs the read command to the UFS host controller 210. The UFS host controller 210 sends the read command to the UFS device 204.

On receiving the read command, the device controller 218 of the UFS device 204 decodes the read command and determines that the path of the payload data flow is along the transmission lane of the UFS device 204. After decoding the read command, the device controller 218 fetches the payload data from the memory 216. Further, before transmitting the payload data to the UFS host 202, the device controller 218 receives the power mode change request ('PMC.REQ') from the UFS host 202. The 'PMC.REQ' includes PACP request ('PACP_REQ') frames. The 'PMC.REQ' can be for the switching of the transmission lane of the UFS host 202 to the Hibernate state. On receiving the 'PMC.REQ' from the UFS host 202, the device controller 218 sends the power mode change confirmation ('PMC.CNF') to the UFS host 202. In response to receiving the 'PMC.CNF' from the UFS device 204, the UFS host controller 210 switches the state of the Tx 214a to the Hibernate state.

Once the transmission lane of the UFS host 202 is switched to the Hibernate state, the device controller 218 transmits the payload data fetched from the memory 216 to the UFS host 202.

Further, on receiving the pre-determined number of data frames of the payload data from the UFS device 204, the UFS host controller 210 switches the transmission lane of the UFS host 202 to the active state by allowing the Tx 214a of the physical layer 214 to exit the Hibernate state. Further, the UFS host controller 210 sends acknowledgment ('ACK') frames to the UFS device 204 for acknowledging the received pre-determined number of data frames. The 'ACK' frames may correspond to the above-described 'AFC' frames. Thus, the Tx 214a of the UFS host 202 can wake up after receiving the pre-determined number of data frames which reduces the consumption of power. Further, until the reception of the complete data from the UFS device 204, the UFS host 202 may operate the Tx 214a/transmission line to enter and exit the Hibernate state.

Further, the UFS host 202 may detect an error in the payload data flow before completion of transfer of the pre-determined number of data frames from the UFS device 204. The UFS host 202 may inform the UFS device 204 about the detected error. Based on the detected error, the UFS host controller 210 of the UFS host 202 enables the Tx 214a of the UFS host 202 to exit the Hibernate state. The UFS host 202 may follow substantially the same procedure followed by the UFS device 204 for the write transaction, to detect the error in the payload data flow.

On transmitting the complete payload data to the UFS host 202, the device controller 218 of the UFS device 204 sends response frames ('RESP') to the UFS host 202 indicating the successful read transaction.

For example, consider a scenario where the UFS host 202 wants to fetch/read 8 KB of data from the memory 216 of the UFS device 204. Since the UFS host 202 wants to perform the read transaction, the UFS host controller 210 of the UFS host 202 can be operated to switch the transmission lane of the UFS host 202 to the Hibernate state by enabling the Tx 214a of the UFS host 202 and the Rx 222b of the UFS device 204 to enter into the Hibernate state. Once the Tx 214a of the UFS host 202 enters into the Hibernate state, the UFS device 204 starts sending the data to the UFS host 202. In an exemplary embodiment of the inventive concept, on receiving 4 KB of data from the UFS device 204, the UFS host controller 210 enables the Tx 214a to exit the Hibernate state. Thus, the transmission lane of the UFS host 202 can be switched to the active state and the Tx 214a of the UFS host 202 may send the 'AFC' frames to the UFS device 204 by acknowledging the reception of 4 KB of data. Further, on transmitting the remaining 4 KB of data, the UFS device 204 sends the 'RESP' response frames to the UFS host 202 indicating the successful transfer of 8 KB of data. Thus, unnecessary power consumption can be prevented.

Figure 4:
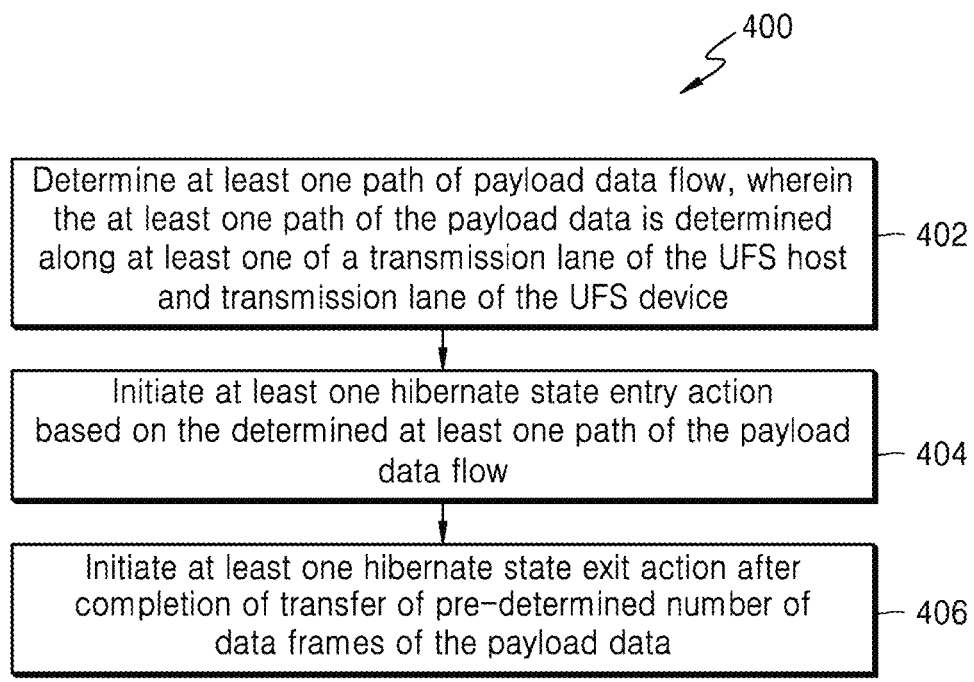
FIG. 4 is a flow diagram illustrating a method for managing communication between the UFS host and the UFS device in the UFS system of FIG. 2, according to an exemplary embodiment of the inventive concept.

FIG. 4 is a flow diagram illustrating a method for managing communication between the UFS host and the UFS device in the UFS system of FIG. 2, according to an exemplary embodiment of the inventive concept.

The method is illustrated by a flow diagram 400. At operation 402, the method includes determining, by the at least one of the UFS host 202 and the UFS device 204, the path of the payload data flow. The UFS host 202 schedules the at least one of the write command for writing the payload data to the memory 216 of the UFS device 204 and the read command for fetching the payload data from the memory 216 of the UFS device 204. The scheduled command may be sent from the UFS host 202 to the UFS device 204. The at least one of the UFS host 202 and the UFS device 204 may process the command to determine the path of the payload data flow. The path of the payload data flow may be determined along the at least one of the transmission lane of the UFS host 202 and the transmission lane of the UFS device 204. The transmission lane of the UFS host 202 is formed by the connection established between the Tx 214a of the UFS host 202 and the Rx 222b of the UFS device 204. The transmission lane of the UFS device 204 is formed by the connection established between the Rx 214b of the UFS host 202 and the Tx 222a of the UFS device 204.

At operation 404, the method includes initiating, by the at least one of the UFS host 202 and the UFS device 204, at least one Hibernate state entry action based on the determined path of payload data flow. The Hibernate state entry action includes at least one of switching, by the UFS host 202, the transmission lane of the UFS host 202 to the Hibernate state on determining that the path of the payload data flow is along the transmission lane of the UFS device 204, and switching, by the UFS device 204, the transmission lane of the UFS device 204 to the Hibernate state on determining that the path of the payload data is along the transmission lane of the UFS host 202.

At operation 406, the method includes, initiating, by the at least one of the UFS host 202 and the UFS device 204, at least one Hibernate state exit action after completion of transfer of the pre-determined number of data frames. The at least one Hibernate state exit action includes enabling at least one of the transmission lane of the UFS host 202 and the transmission lane of the UFS device 204 to exit from the Hibernate state. Thus, operating the at least one of the UFS host 202 and the UFS device 204 to enter and exit the Hibernate state reduces power consumption.

The various actions, acts, blocks, operations, or the like in the method illustrated in the flow diagram 400 may be performed in the order presented, in a different order, or simultaneously. Further, in exemplary embodiments of the inventive concept, some of the actions, acts, blocks, operations, or the like may be omitted, added, modified, skipped, or the like without departing from the scope of the inventive concept.

Figure 5A:
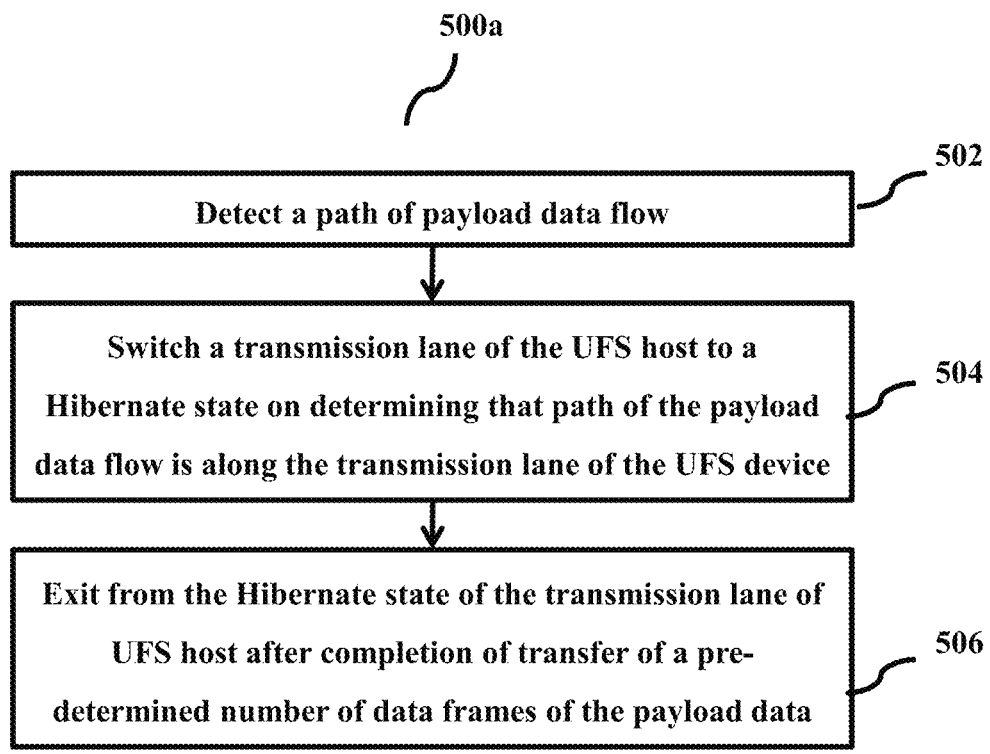
FIG. 5a is a flow diagram illustrating a method for managing a read transaction between the UFS host and the UFS device in the UFS system of FIG. 2, according to an exemplary embodiment of the inventive concept.

FIG. 5a is a flow diagram illustrating a method for managing a read transaction between the UFS host and the UFS device in the UFS system of FIG. 2, according to an exemplary embodiment of the inventive concept.

The method is illustrated in a flow diagram 500a. At operation 502, the method includes determining, by the at least one of the UFS host 202 and the UFS device 204, the path of the payload data flow. Based on the command scheduled by the UFS host 202, the at least one of the UFS host 202 and the UFS device 204 determines the path of the payload data flow along the at least one of the transmission lane of the UFS host 202 and the transmission lane of the UFS device 204.

At operation 504, the method includes switching, by operating the at least one of the UFS host 202 and the UFS device 204, the transmission lane of the UFS host 202 to the Hibernate state on determining that the path of the payload data flow is along the transmission lane of the UFS device 204. The path of the payload data flow along the transmission lane of the UFS device 204 indicates that the read transaction needs to be performed between the UFS host 202 and the UFS device 204. The UFS host 202 sends the read command to the UFS device 204. Further, the UFS host 202 sends the power mode change request ('PMC.REQ') to the UFS device 204 for switching the transmission lane of the UFS host 202 to the Hibernate state since the UFS host 202 wants to fetch the payload data from the memory 216 of the UFS device 204. On receiving the 'PMC.REQ' from the UFS host 202, the UFS device 204 sends the power mode change confirmation ('PMC.CNF') to the UFS host 202. On receiving the 'PMC.CNF' from the UFS device 204, the UFS host 202 and the UFS device 204 can be operated to switch the transmission lane of the UFS host 202 to the Hibernate state by enabling the Tx 214a of the physical layer 214 of the UFS host 202 and the Rx 222b of the UFS device 204 to enter into the Hibernate state. Thus, the Tx 214a enters into the Hibernate state when the Rx 214b is receiving the payload data from the UFS device 204.

At operation 506, the method includes exiting, by operating the at least one of the UFS host 202 and the UFS device 204, from the Hibernate state of the transmission lane of the UFS host 202 after completion of transfer of the pre-determined number of data frames of the payload data. Once the transmission lane of the UFS host 202 is switched to the Hibernate state, the UFS device 204 starts sending the payload data to the UFS host 202. On completion of transfer of the pre-determined number of data frames, the UFS host 202 and the UFS device 204 can be operated to enable the Tx 214a and the Rx 222b to exit the Hibernate state. The Tx 214a may be enabled to exit the Hibernate state for sending the 'AFC' frames to the UFS device 204 to acknowledge the reception of the pre-determined number of data frames from the UFS device 204. The Tx 214a/transmission lane of the UFS host 202 may be switched from the Hibernate state to the active state only on receiving the pre-determined number of data frames. In an exemplary embodiment of the inventive concept, operations 504 and 506 as described above may be repeated until the completion of transfer of entire payload data to the UFS host 202.

In addition, the UFS host 202 may detect an error in the payload data flow before completing the transfer of the pre-determined number of the data frames. Based on the detected error, the UFS host 202 and the UFS device 204 may enable the Tx 214a of the UFS host 202 and the Rx 222b of the UFS device 204 to exit the Hibernate state. Thus, failure of the read transaction may be realized at an earlier stage.

The various actions, acts, blocks, operations, or the like in the method illustrated in the flow diagram 500a may be performed in the order presented, in a different order, or simultaneously. Further, in exemplary embodiments of the inventive concept, some of the actions, acts, blocks, operations, or the like may be omitted, added, modified, skipped, or the like without departing from the scope of the inventive concept.

Figure 5B:
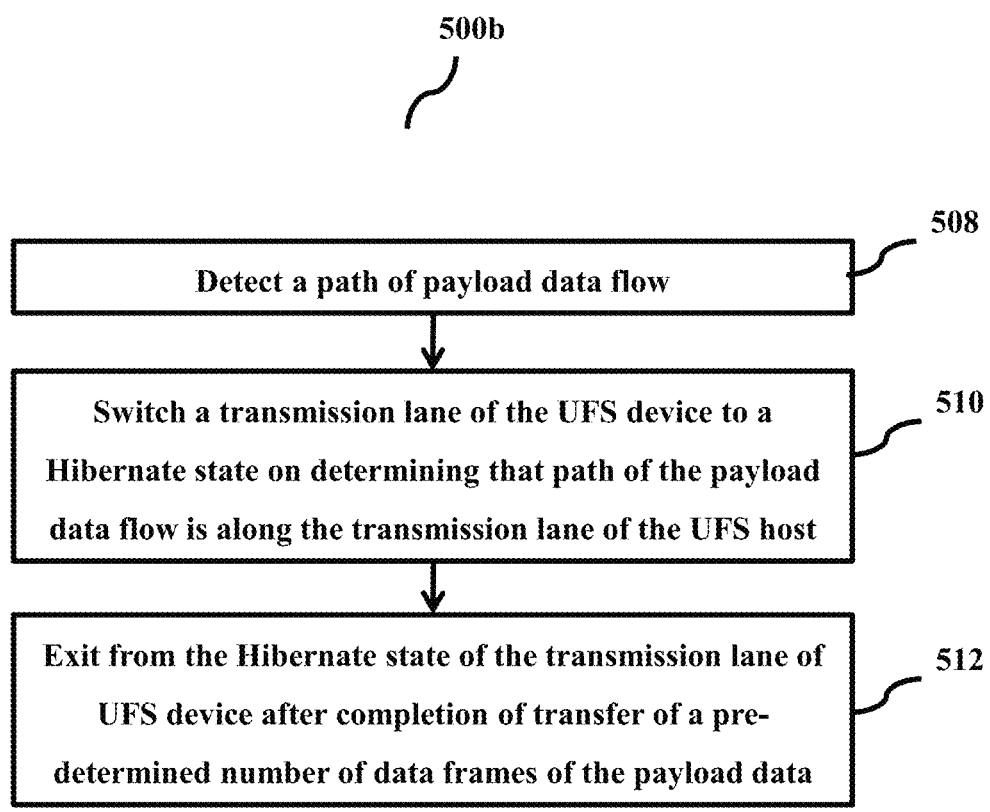
FIG. 5b is a flow diagram illustrating a method for managing a write transaction between the UFS host and the UFS device in the UFS system of FIG. 2, according to an exemplary embodiment of the inventive concept.

FIG. 5b is a flow diagram illustrating a method for managing a write transaction between the UFS host and the UFS device in the UFS system of FIG. 2, according to an exemplary embodiment of the inventive concept.

The method is illustrated in a flow diagram 500b. At operation 508, the method includes determining, by the at least one of the UFS host 202 and the UFS device 204, the path of the payload data flow. Based on the command scheduled by the UFS host 202, the at least one of the UFS host 202 and the UFS device 204 determines the path of the payload data flow along the at least one of the transmission lane of the UFS host 202 and the transmission lane of the UFS device 204.

At operation 510, the method includes switching, by operating the at least one of the UFS host 202 and the UFS device 204, the transmission lane of the UFS device 204 to the Hibernate state on determining that the path of the payload data flow is along the transmission lane of the UFS host 202. The path of the payload data flow along the transmission lane of the UFS Host 202 indicates the write transaction need to be performed between the UFS host 202 and the UFS device 204. The UFS host 202 may send the write command to the UFS device 204 for writing the payload data to the memory 216 of the UFS device 204. In response to the write command, the UFS device 204 sends the 'RTT Response' to the UFS host 202 and also sends the 'PMC.REQ' to the UFS Host 202 for switching the transmission lane of the UFS device 204 to the Hibernate state. On receiving the 'PMC.CNF' from the UFS Host 202, the UFS device 204 and the UFS host 202 may switch the transmission lane of the UFS device 204 to the Hibernate state. The transmission lane of the UFS device 204 may be switched to the Hibernate state by enabling the Tx 222a of the physical layer 222 of the UFS device 204 and the Rx 214b of the UFS host 202 to enter into the Hibernate state. Thus, the Tx 222a may enter into the Hibernate state when the Rx 222b of the UFS device 204 starts receiving the payload data from the UFS host 202.

At operation 512, the method includes exiting, by operating the at least one of the UFS host 202 and the UFS device 204, from the Hibernate state of the transmission lane of the UFS device 204 after completion of transfer of the pre-determined number of data frames of the payload data. Once the transmission lane of the UFS device 204 is switched to the Hibernate state, the UFS host 202 starts sending the payload data to the UFS device 204. On receiving the pre-determined number of data frames, the UFS device 204 and the UFS host 202 enable the Tx 222a and the Rx 214b to exit the Hibernate state. Thus, the transmission lane of the UFS device 204 can exit the Hibernate state and the Tx 222a may be enabled to send the 'AFC' frames to the UFS host 202 to acknowledge the reception of the pre-determined number of data frames. Thus, the UFS host 202 may need not to wait for acknowledgment from the UFS device 204 before completion of transfer of the pre-determined number of data frames. In an exemplary embodiment of the inventive concept, operations 510 and 512 as described above may be repeated until the completion of transfer of entire payload data to the UFS device 204.

In addition, the UFS device 204 may detect an error in the payload flow before completing the transfer of the pre-determined number of the data frames. Based on the detected error, the UFS device 204 may enable the Tx 222a of the UFS device 204 to exit the Hibernate state and the UFS host 202 may enable the Rx 214b to exit the Hibernate state. Thus, failure of write transaction can be detected at an earlier stage.

The various actions, acts, blocks, operations, or the like in the method illustrated in the flow diagram 500b may be performed in the order presented, in a different order, or simultaneously. Further, in exemplary embodiments of the inventive concept, some of the actions, acts, blocks, operations, or the like may be omitted, added, modified, skipped, or the like without departing from the scope of the inventive concept.

Figure 6A:
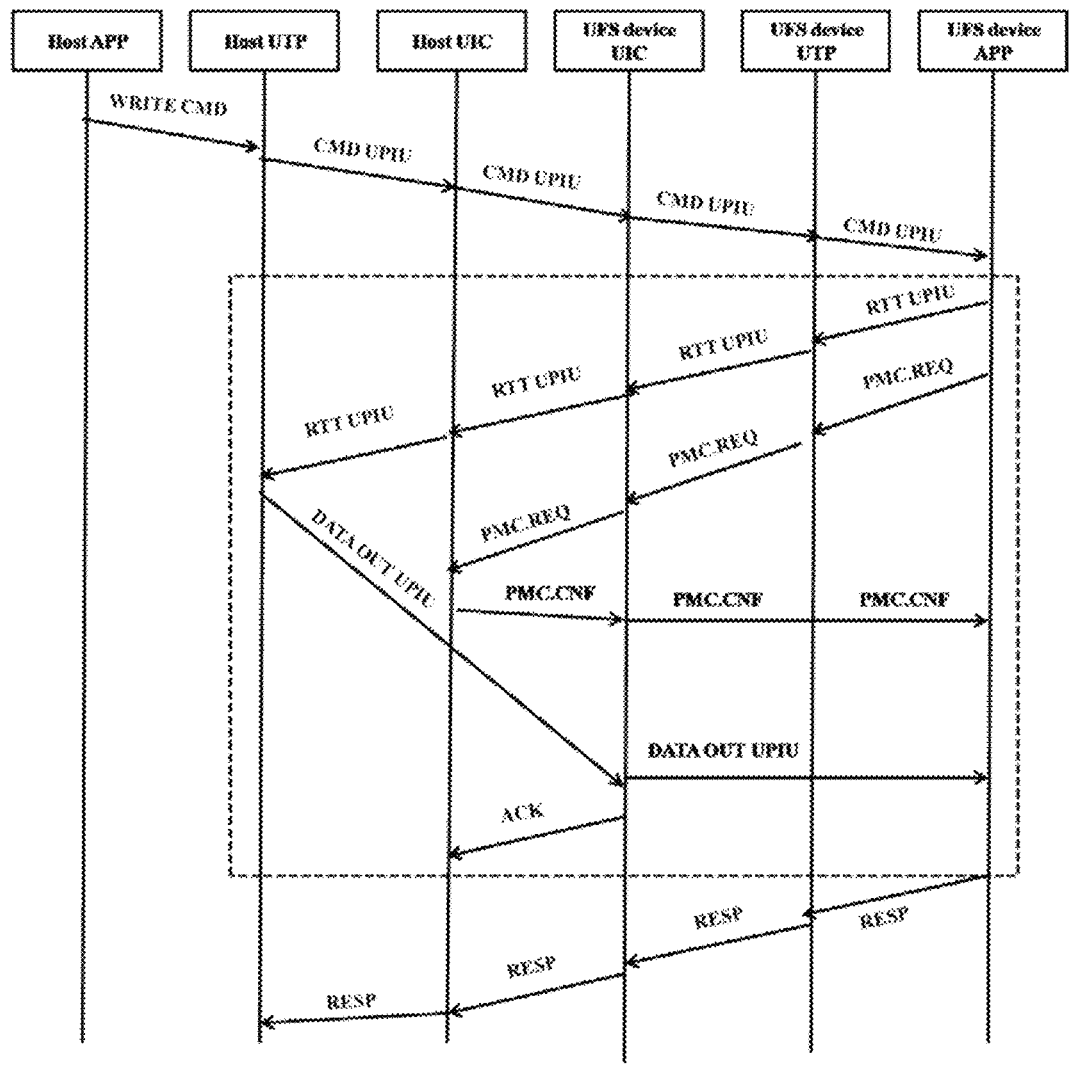
FIG. 6a depicts a sequence flow, where the write transaction between the UFS host and the UFS device in the UFS system of FIG. 2 can be realized with low power consumption, according to an exemplary embodiment of the inventive concept.

FIG. 6a depicts a sequence flow, where the write transaction between the UFS host and the UFS device in the UFS system of FIG. 2 can be realized with low power consumption, according to an exemplary embodiment of the inventive concept.

As illustrated in FIG. 6a, the application 206 of the UFS host 202 initiates the write command ('WRITE CMD') and outputs the command to the UFS host controller 210 using a UFS transport Protocol layer (UTP). The UFS host controller 210 further transmits the 'WRITE CMD UPIU' to the UIC (the link layer and the physical layer 214). The Tx 214a of the physical layer 214 of the UFS host 202 transmits the 'WRITE CMD UPIU' to the UIC (the link layer and the physical layer 222) of the UFS device 204. The UIC forwards the 'WRITE CMD UPIU' to the device controller 218 of the UFS device 204 using the UTP layer. The device controller 218 further forwards the 'WRITE CMD UPIU' to an application of the UFS device 204. On receiving the 'WRITE CMD UPIU' from the UFS host 202, the application of the UFS device 204 generates the 'RTT UPIU' response and forwards the 'RTT UPIU' response to the device controller 218 using the UTP layer. The device controller 218 of the UFS device 204 forwards the 'RTT UPIU' response to the UIC. The physical layer 222 of the UIC of UFS device 204 sends the 'RTT UPIU' response to the UIC of the UFS host 202 through the Tx 222a. The physical layer 214 of the UFS host 202 forwards the 'RTT UPIU' to the UFS host controller 210 of the UFS host 202 using the UTP layer.

After sending the 'RTT UPIU' response to the UFS host 202 in response to the 'WRITE CMD UPIU', the application of the UFS device 204 initiates the power mode change request 'PMC.REQ'. The 'PMC.REQ' may be initiated to switch the Tx 222a of the UFS device 204 to the Hibernate state. The application of the UFS device 204 forwards the 'PMC.REQ' to the device controller 218 which further forwards the 'PMC.REQ' to the UIC of the UFS device 204.

The physical layer 222 of the UFS device 204 transmits the 'PMC.REQ' to the UIC of the UFS host 202 through the Tx 222a. On receiving the 'PMC.REQ', the UIC of the UFS host 202 generates the power mode change confirmation 'PMC.CNF' and the physical layer 214 of the UIC of the UFS Host 202 transmits the 'PMC.CNF' to the UIC of the UFS device 204. The physical layer 222 of the UIC of the UFS device 204 forwards the 'PMC.CNF' to the application of the UFS device 204. Thereafter, the device controller 218 of the UFS device 204 switches the state of the Tx 222a to the Hibernate state. Further, on generating the 'PMC.CNF' in response to the 'PMC.REQ' received from the UFS device 204, the UFS host controller 210 switches the state of the Rx 214b to the Hibernate state.

The UFS host controller 210 forwards the payload data 'DATA OUT UPIU' to the UIC of the UFS host 202 by adding a header to the payload data. The physical layer 214 UIC of the UFS host 202 transfers the payload data to the UIC of the UFS device 204 through the Tx 214a (the transmission lane of the UFS host 202). The physical layer 222 of the UIC of the UFS device 204 forwards the payload data 'DATA.OUT UPIU' to the application of the UFS device 204. Further, the device controller 218 of the UFS device 204 performs the write function to the memory 216 to store the data transferred by the UFS Host 202.

After completion of transfer of the pre-determined number of data frames of the payload data, the device controller 218 enables the Tx 222a to exit the Hibernate state. The Tx 222a of the UFS device 204 sends the 'ACK' to the UIC of the UFS host 202 for acknowledging the reception of pre-determined number of data frames. Thus, power consumption can be reduced.

In an exemplary embodiment of the inventive concept, the device controller 218 of the UFS device 204 and the UFS host controller 210 of the UFS host 202 may enable the transmission lane of the UFS device 204 to enter and exit the Hibernate state in a single direction as described above until the reception of the complete payload data. On receiving the complete payload data, the application of the UFS device 204 may generate a response ('RESP') and forward the 'RESP' to the device controller 218 which further forwards the 'RESP' to the UIC of the UFS device 204. The physical layer 222 of the UIC of the UFS device 204 transfers the 'RESP' to the UIC of the UFS host 202 by indicating successful reception of the complete payload data.

Figure 6B:
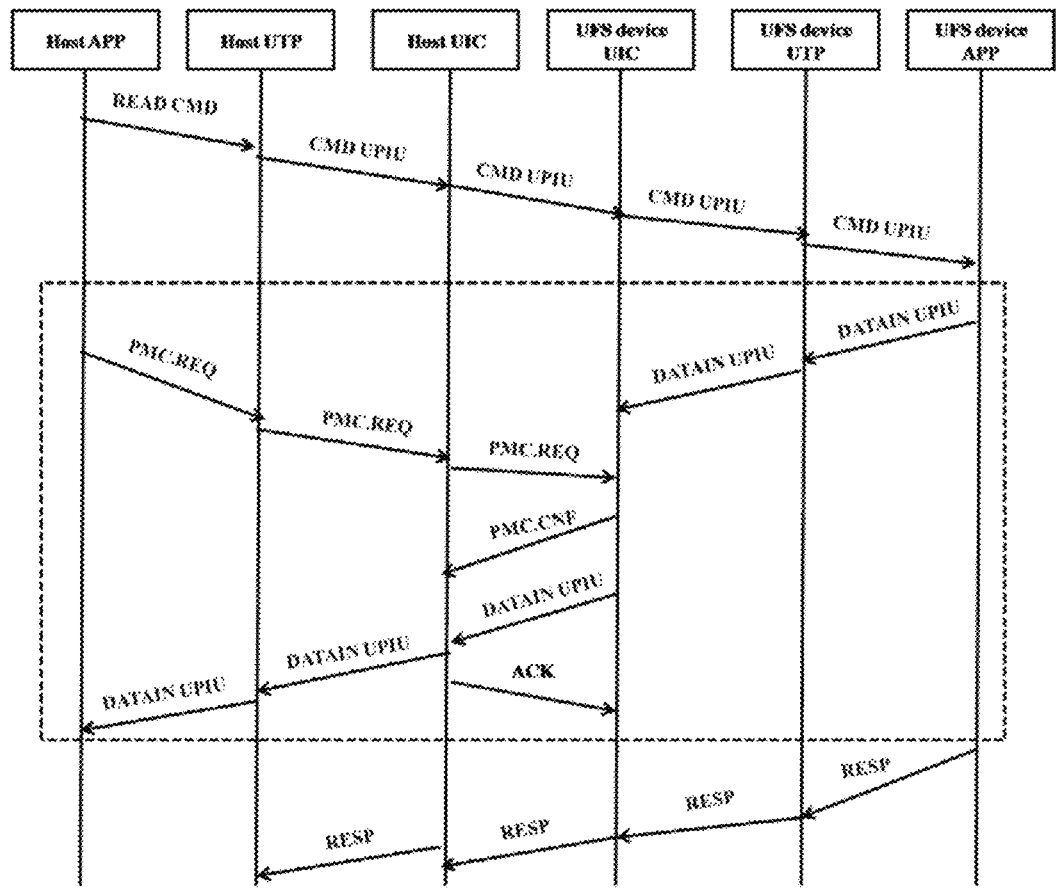
FIG. 6b depicts a sequence flow, where a read transaction between the UFS host and the UFS device in the UFS system of FIG. 2 can be realized with low power consumption, according to an exemplary embodiment of the inventive concept.

FIG. 6b depicts a sequence flow, where the read transaction between the UFS host and the UFS device in the UFS system of FIG. 2 can be realized with low power consumption, according to an exemplary embodiment of the inventive concept.

As illustrated in FIG. 6b, the application 206 of the UFS host 202 initiates the read command ('READ CMD') and outputs the 'READ CMD' to the UFS host controller 210 using the UTP layer. The UFS host controller 210 further transmits the 'READ CMD UPIU' to the UIC (the link layer and the physical layer 214) by adding the header to the 'READ CMD'. The Tx 214a of the physical layer 214 of the UFS host transmits the 'READ CMD UPIU' to the UIC (the link layer and the physical layer 222) of the UFS device 204. The UIC forwards the 'READ CMD UPIU' to the device controller 218 of the UFS device 204 using the UTP layer. The device controller 218 further forwards the 'READ CMD UPIU' to the application of the UFS device 204.

On receiving the 'READ CMD UPIU' from the UFS host 202, the application of the UFS device 204 generates 'DATA IN UPIU' command to the device controller 218 of the UFS device 204, which fetches the payload data from the memory 216 and outputs the payload data to the UIC of the UFS device 204.

The UFS host 202 generates the power mode change request 'PMC.REQ' to change the state of the Tx 214a of the UFS host 202. The 'PMC.REQ' may be initiated to switch the Tx 214a of the UFS host 202 and the Rx 222b of the UFS device 204 to the Hibernate state. The UIC of the UFS device 204 forwards the power mode change request confirmation 'PMC.CNF' to the UIC of the UFS host 202 through the Tx 222a of the UFS device 204. Further, on generating the 'PMC.CNF' in response to the 'PMC.REQ' received from the UFS host, the device controller 218 of the UFS device 204 switches the state of the Rx 222b to the Hibernate state. On receiving the 'PMC.CNF' from the UFS device 204, the UFS host controller 210 of the UFS host 202 switches the state of the Tx 214a to the Hibernate state.

The physical layer 222 of the UIC of the UFS device 204 sends the fetched data 'DATA IN UPIU' to the UIC of the UFS host 202. The physical layer 214 of the UIC of the UFS host 202 forwards the 'DATA IN UPIU' to the UFS host controller 210 which further forwards the 'DATA IN UPIU' to the application 206 of the UFS host 202. On completion of transfer of the pre-determined number of frames of the payload data, the UFS host controller 210 enables the Tx 214a of the UFS host 202 to exit the Hibernate state. The Tx 214a of the UFS host 202 sends the 'ACK' frames to the UIC of the UFS device 204 for acknowledging the reception of the pre-determined number of frames of the payload data.

In an exemplary embodiment of the inventive concept, the UFS host controller 210 of the UFS host 202 and the device controller 218 of the UFS device 204 may enable the transmission lane of the UFS host 202 to enter and exit the Hibernate state as described above until the reception of the complete payload data. On transmitting the complete payload data, the application of the UFS device 204 may generate the 'RESP' and forward the 'RESP' to the device controller 218 which further forwards the 'RESP' to the UIC of the UFS device 204. The physical layer 222 of the UIC of the UFS device 204 transfers the 'RESP' to the UIC of the UFS host 202 by indicating the successful transfer of the complete payload data.

The exemplary embodiments disclosed herein can be implemented through at least one software program running on at least one hardware device and performing network management functions to control the elements. The elements shown in FIG. 2 can be at least one of a hardware device, or a combination of a hardware device and a software module.

The exemplary embodiments disclosed herein describe methods and systems for managing communication between a UFS Host and a UFS device with low power consumption. Therefore, it is understood that the scope of the inventive concept is extended to a program and a computer readable means having the program therein, such that the computer readable means contains program code for implementation of one or more operations of the method, and the program runs on a server, a mobile device, or any suitable programmable device. The method may be implemented through or together with a software program written in, e.g., Very high speed integrated circuit Hardware Description Language (VHDL) or another programming language, or implemented by one or more VHDL or several software modules being executed on at least one hardware device. The hardware device can be any kind of portable device that can be programmed. The system may also include hardware means such as an application-specific integrated circuit (ASIC), a combination of hardware and software means such as an ASIC and a field-programmable gate array (FPGA), or at least one microprocessor and at least one memory with software modules located therein. The methods described above may be implemented partly in hardware and partly in software. Alternatively, the inventive concept may be implemented on different hardware devices, e.g., using a plurality of CPUs.

While the inventive concept has been shown and described with reference to exemplary embodiments thereof, those of ordinary skill in the art will readily appreciate that modifications in form and details may be made thereto without departing from the spirit and scope of the inventive concept as set forth by the following claims.

What is claimed is:

1. A method for managing communication between a Universal Flash Storage (UFS) device and a UFS Host, the method comprising:
   determining, by a device, at least one path of payload data flow along at least one of a transmission lane of the UFS host and a transmission lane of the UFS device, wherein the device is at least one of the UFS host and the UFS device;
   initiating, by the device, at least one Hibernate state entry action based on the determined at least one path of the payload data flow between the UFS host and the UFS device; and
   initiating, by the device, at least one Hibernate state exit action after completion of transfer of a pre-determined number of data frames of the payload data between the UFS host and the UFS device;
   wherein determining the at least one path of the payload data flow includes:
      scheduling, by the UFS host, at least one command, wherein the at least one command includes at least one of at least one write command and at least one read command; and
      processing, by the UFS host, the at least one scheduled command to determine the at least one path of the payload data flow,
      wherein the at least one path of the payload data flow is determined along the transmission lane of the UFS host for the at least one write command and the at least one path of the payload data flow is determined along the transmission lane of the UFS device for the at least one read command.

2. The method of claim 1, wherein the transmission lane of the UFS host is formed by a connection established between a transmission unit (Tx) of the UFS host and a reception unit (Rx) of the UFS device.

3. The method of claim 1, wherein the transmission lane of the UFS device is formed by a connection established between a transmission unit (Tx) of the UFS device and a reception unit (Rx) of the UFS host.

4. The method of claim 1, wherein initiating the Hibernate state entry action includes:
   switching the transmission lane of the UFS host to the Hibernate state on determining the at least one path of the payload data flow is along the transmission lane of the UFS device; and
   switching the transmission lane of the UFS device to the Hibernate state on determining the at least one path of the payload data flow is along the transmission lane of the UFS host.

5. The method of claim 4, wherein switching the transmission lane of the UFS host to the Hibernate state includes:

transmitting, by the UFS host, a power mode change request ('PMC.REQ') to the UFS device after sending the at least one read command to the UFS device;

generating, by the UFS device, a PMC confirmation ('PMC.CNF') in response to the 'PMC.REQ' received from the UFS host, wherein the 'PMC.CNF' is transmitted to the UFS host by the UFS device;

switching, by the UFS device, the Rx of the UFS device to the Hibernate state on generating the 'PMC.CNF' in response to the 'PMC.REQ' received from the UFS host; and switching, by the UFS host, the Tx of the UFS host to the Hibernate state on receiving the 'PMC.CNF' from the UFS device.

6. The method of claim 4, wherein switching the transmission lane of the UFS device to the Hibernate state includes:

decoding, by the UFS device, the at least one write command received from the UFS host;

transmitting, by the UFS device, a Ready to Transfer UFS Protocol Information Unit ('RTT UPIU') to the UFS host based on the decoding of the at least one write command;

transmitting, by the UFS device, a 'PMC.REQ' to the UFS host after transmitting the 'RTT UPIU';

generating, by the UFS host, a 'PMC.CNF' in response to the 'PMC.REQ' received by the UFS device, wherein the 'PMC.CNF' is transmitted to the UFS device by the UFS host;

switching, by the UFS host, the Rx of the UFS Host to the Hibernate state on generating the 'PMC.CNF' in response to the 'PMC.REQ' received from the UFS device; and switching, by the UFS device, the Tx of the UFS device to the Hibernate state on receiving the 'PMC.CNF' from the UFS Host.

7. The method of claim 1, further comprising processing, by the UFS device, the scheduled at least one command to determine the at least one path of the payload data flow.

8. The method of claim 1, wherein initiating the at least one Hibernate state exit action includes:

exiting the Hibernate state of the transmission lane of the UFS host after completion of transfer of the pre-determined number of data frames of the payload data; and exiting the Hibernate state of the transmission lane of the UFS device after completion of transfer of the pre-determined number of data frames of the payload data.

9. The method of claim 8, wherein exiting the Hibernate state of the transmission lane of the UFS host includes:

receiving, by the UFS host, the payload data from the UFS device after switching the Tx of the UFS host to the Hibernate state;

enabling, by the UFS host, the Tx of the UFS Host to exit the Hibernate state after completion of reception of the pre-determined number of data frames of the payload data from the UFS device, wherein the Tx of the UFS host is enabled to exit the Hibernate state for sending acknowledgment frames ('ACK' frames) to the UFS device to acknowledge reception of the pre-determined number of data frames of the payload data from the UFS device; and enabling, by the UFS device, the Rx of the UFS device to exit the Hibernate after completion of transfer of the pre-determined number of data frames of the payload data to the UFS host.

10. The method of claim 9, further comprising:

detecting, by the UFS host, at least one error in the payload data flow before receiving the pre-determined number of data frames of the payload data from the UFS device;

enabling, by the UFS host, the Tx of the UFS host to exit the Hibernate state based on the detected at least one error; and enabling, by the UFS device, the Rx of the UFS device to exit the Hibernate state based on the detected at least one error.

11. A method for reducing power consumption in a Universal Flash Storage (UFS) system including a UFS host and a UFS device, the method comprising:

detecting, by a device, a path of payload data flow, wherein the device is at least one of the UFS host and the UFS device;

switching, by the device, a transmission lane of the UFS host to a Hibernate state on determining that the path of the payload data flow is along a transmission lane of the UFS device;

exiting, by the device, from the Hibernate state of the transmission lane of the UFS host after completion of transfer of a pre-determined number of data frames of the payload data;

switching, by the device, the transmission lane of the UFS device to the Hibernate state on determining that the path of the payload data flow is along the transmission lane of the UFS host; and exiting, by the device, from the Hibernate state of the transmission lane of the UFS device after completion of transfer of a pre-determined number of data frames of the payload data.

12. A Universal Flash Storage (UFS) system comprising:

a device, wherein the device is at least one of a UFS host and a UFS device, wherein the device is configured to:

determine at least one path of payload data flow along at least one of a transmission lane of the UFS host and a transmission lane of the UFS device;

initiate at least one Hibernate state entry action based on the determined at least one path of the payload data flow;

initiate at least one Hibernate state exit action after completion of transfer of a pre-determined number of data frames of the payload data between the UFS host and the UFS device;

switch the transmission lane of the UFS host to the Hibernate state on determining the at least one path of the payload data flow is along the transmission lane of the UFS device; and switch the transmission lane of the UFS device to the Hibernate state on determining the at least one path of the payload data flow is along the transmission lane of the UFS host.

13. The UFS system of claim 12, wherein the transmission lane of the UFS host is formed by a connection established between a transmission unit (Tx) of the UFS host and a reception unit (Rx) of the UFS device.

14. The UFS system of claim 12, wherein the transmission lane of the UFS device is formed by a connection established between a transmission unit (Tx) of the UFS device and a reception unit (Rx) of the UFS host.

15. The UFS system of claim 12, wherein the UFS host is further
configured to:
schedule at least one command, wherein the at least one command includes at least one of at least one write command and at least one read command; and
process the at least one command to determine the at least one path of the payload data flow,
wherein the path of the payload data flow is determined along the transmission lane of the UFS host for the at least one write command and the path of the payload data flow is determined along the transmission lane of the UFS device for the at least one read command.

16. The UFS system of claim 12, wherein the device is further configured to:
exit the Hibernate state of the transmission lane of the UFS host after completion of transfer of the pre-determined number of data frames of the payload data; and
exit the Hibernate state of the transmission lane of the UFS device after completion of transfer of the pre-determined number of data frames of the payload data.

17. The UFS system of claim 16, wherein the UFS host is further configured to:
receive the payload data from the UFS device after switching the Tx of the UFS host to the Hibernate state; and
enable the Tx of the UFS host to exit the Hibernate state after completion of reception of the pre-determined number of data frames of the payload data from the UFS device, wherein the Tx of the UFS host is enabled to exit the Hibernate state for sending acknowledgment frames ('ACK' frames) to the UFS device to acknowledge reception of the pre-determined number of data frames of the payload data from the UFS device.

18. The UFS system of claim 17, wherein the UFS device is further configured to:
enable the Rx of the UFS device to exit the Hibernate state after completion of transfer of the pre-determined number of data frames of the payload data to the UFS host.

19. The UFS system of claim 17, wherein the UFS host is further configured to:
detect at least one error in the payload data flow before receiving the pre-determined number of data frames of the payload data from the UFS device; and
enable the Tx of the UFS host to exit the Hibernate state.

20. The UFS system of claim 16, wherein the UFS device is further configured to:
receive the payload data from the UFS host after switching the Tx of the UFS device to the Hibernate state; and
enable the Tx of the UFS device to exit the Hibernate state after completion of reception of the pre-determined number of data frames of the payload data from the UFS host, wherein the Tx of the UFS device is enabled to exit the Hibernate state for sending acknowledgment frames to the UFS host to acknowledge reception of the pre-determined number of data frames of the payload data from the UFS host.

* * * * *